United States Patent Office 3,154,585
Patented Oct. 27, 1964

---

3,154,585
METHOD OF PRODUCING KETONES
AND ALCOHOLS
Pat W. K. Flanagan, Ponca City, Okla., assignor to Continental Oil Company, Ponca City, Okla., a corporation of Delaware
No Drawing. Filed July 21, 1961, Ser. No. 125,648
10 Claims. (Cl. 260—592)

This invention relates to a method of producing alcohols and ketones. More particularly, but not by way of limitation, the invention relates to a method of economically producing ketones and secondary alcohols by reacting trialkylaluminum with an acyl halide.

The reaction of alkylaluminum halides with acyl halides to yield ketones has been reported by Adkins and Scanley (Journal of the American Chemical Society, volume 73, page 2,854, 1951). It is also known that trialkyl carbinols may be prepared by reacting alkylaluminum halides with acyl halides. There is no indication that ketone intermediates are produced in the latter process.

In view of this prior work in reacting di- and mono-alkylaluminum halides with acyl halides, it would seem logical to suppose that the more reactive trialkylaluminum should react readily with acyl halides to yield the ketone products in greater quantities per mole of the alkyl-aluminum compound than the yields obtainable using the di- and mono-alkylaluminum halides as reactants. However, as recent reports by workers in this field have indicated, attempts to satisfactorily synthesize ketones using trialkylaluminum and acid halides have been unsuccessful. This has been attributed to the high reactivity of the first aluminum-carbon bond which permits the trialkylaluminum reactant to react with the ketone product to produce an undesirable compound. Thus, only extremely low yields of the ketone can be obtained, and the reaction therefore becomes totally infeasible as a means of producing such ketones.

The present invention comprises a method for economically preparing certain ketones by reacting trialkyl-aluminum with acyl halides. Substantial yields of the ketone product may be obtained by carefully controlling the reaction conditions and by "killing" the reaction at the proper time by hydrolyzing the alkylaluminum compounds present in the reaction mixture to prevent undesirable reactions of these compounds with the ketones produced. Another important aspect of the invention is the production in the ketone synthesis, of valuable secondary alcohols which are released from the reaction product by hydrolysis. The secondary alcohols so produced are a particularly useful product, since such alcohols may easily be converted to the corresponding esters which find widespread industrial usage.

The method recommends itself as a means of producing ketones, since the use of the trialkylaluminum in the controlled reaction of the present invention allows such ketones to be produced more economically than they have previously been produced using mono- or dialkyl-aluminum halides. Moreover, within my personal knowledge, such previous processes have not yielded secondary alcohols. Control of the relative yields of ketone and alcohol is obtainable by controlling the process conditions in accordance with the teachings of the present invention.

As indicated by the foregoing discussion, it is a major object of the present invention to provide a novel and improved process for preparing ketones.

It is another object of the invention to provide a process for producing certain ketone compounds and the corresponding secondary alcohols.

A further object of the invention is to indicate the manner in which the proportionate yields of ketone and secondary alcohol are controlled when such compounds are produced by reacting trialkylaluminum with an acyl halide followed by hydrolysis.

An additional object of the invention is to provide a process by the use of which certain ketones are more economically prepared than has been possible with certain previous processes.

Other objects and advantages of the invention will become apparent upon reading the following disclosure.

In the reaction of trialkylaluminum with an acyl halide, the reaction initially proceeds as follows:

(a)

where R is an alkyl group, R' is an alkyl, aryl, alkaryl, aralkyl, or cycloalkyl group and X is halogen. While there is no limit to the number of carbon atoms in R and R', these groups usually contain from 1 to about 30 and from 1 to about 30 carbon atoms, respectively. A portion of the ketone product is converted to the corresponding secondary alcohol by the following reactions:

(b)
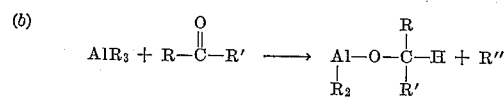

wherein R'' is alkene.

(c)
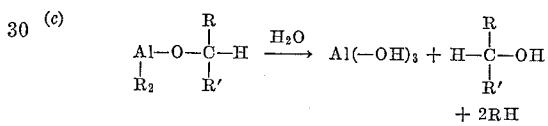

The water required for reaction (c) is provided by hydrolysis of the reaction mixture.

The dialkylaluminum halide produced in reaction (a) will react with the acyl halide to produce additional ketone according to the reaction:

(d)
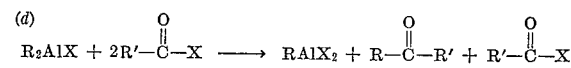

The ketone produced in reactions (a) and (b) can then react with the monoalkylaluminum dihalide formed in reaction (d) to form a very stable complex compound which does not undergo further reaction with the acyl halide.

The invention is further illustrated by reference to the following specific examples of reactions which can be carried out within its scope, including the reaction of triethylaluminum with isobutyryl chloride, tridodecylaluminum with propionyl bromide, triisopropylaluminum with cyclopropyl carboxyl chloride, tridecylaluminum with propionyl bromide, triisobutylaluminum with cyclohexyl carboxoyl bromide, trihexylaluminum with naphthoyl chloride, tripentadecylaluminum with benzoyl bromide, trinonylaluminum with benzoyl chloride, trioctylaluminum with valeryl iodide, tritriacontylaluminum with acetyl chloride, tetradecylaluminum with butyryl iodide, trioctylaluminum with phenyl acetyl chloride, trioctadecylaluminum with p-phenyl benzoyl bromide, tritricosylaluminum with isophthaloyl iodide, trieicosylaluminum with dodecyl benzoyl chloride, tripentacosylaluminum with m-methyl benzoyl chloride, triethylaluminum with benzoyl bromide, trihexyl-aluminum with valeryl chloride, and the like.

I have ascertained, as very recently confirmed by other workers in the field that, if the reaction of trialkylaluminum with acyl halide is allowed to proceed without interruption to completion, very low yields of the ketone are obtained. Since these low yields are not attributable in any large degree to the conversion of the ketone to the corresponding secondary alcohol, it appears that a substantial portion of the total ketone produced is lost by undesirable reactions with trialkylaluminum and with the mono- and possibly dialkylaluminum halides in the reaction mixture, or by reactions catalyzed by the trialkylaluminum. The results of my experimentation with the trialkylaluminum-acyl halide reaction indicate that the cited undesirable competing reactions proceed with increasing rapidity as the overall reaction time increases. Thus, in the initial stages of the trialkylaluminum-acyl halide reaction, the ketone is produced faster than it is lost by undesirable side reactions. However, after a period of time has elapsed following the commencement of the reaction, the total ketone yield begins to decrease as the undesirable reactions commence to occur at a faster rate.

An important aspect of the present invention, therefore, resides in the discoveries that the yield of ketone can be vastly improved by (a) maintaining the temperature of the reaction mixture at a level which favors the initial progression of the reaction of the trialkylaluminum with the acyl halide over the initial progression of the reaction between the ketone product and the alkylaluminum compounds in the reaction mixture, and (b) adding water to the reaction mixture at a critical time following the commencement of the reaction to hydrolyze the alkylaluminum compounds and thereby stop the described reactions. As pointed out previously, alkoxides formed by the reaction of ketone with the trialkylaluminum are converted to secondary alcohols in the hydrolysis step. Also, by careful control of the time at which the reactions are interrupted, the relative yields of ketone and secondary alcohol can be controlled.

Preferably and particularly as an aid in controlling the reaction temperature, the process of this invention is carried out in the presence of a diluent which can be any suitable organic compound, for example, an aliphatic or aromatic hydrocarbon, which is in the liquid state under the reaction conditions and is substantially inert to the reaction system. Examples of diluents which can be employed are paraffins, such as hexane, heptane, cyclohexane, methylcyclopentane, octane, and the like; aromatic compounds, such as benzene and toluene; ethers, such as diethyl ether, tetrahydrofuran, and the like.

Since the trialkylaluminum is very reactive with oxygen, it is very desirable that the reactions of this compound with the acyl halides be carried out in an inert atmosphere of nitrogen, helium, argon gas, or the like. Also, the temperature at which the reactants are combined should preferably be moderately low (in the vicinity of 0° C.), although the reaction gives acceptable yields of the ketone and alcohol at temperatures as high as 25° C. and perhaps slightly higher. Finally, the yields of ketone and alcohol are improved if the trialkylaluminum is added to the acyl halide rather than vice versa. After the reactants are combined, it is desirable that the temperature of the reaction mixture be held between about 0° C. and about 40° C. by cooling as the reaction proceeds. As pointed out previously, reaction time is an important variable in controlling the yield of ketone product. Broadly, the reactions of this invention can be carried out over a time period from about 0.01 to about 20 hours. However, the preferred reaction time varies from about 0.1 to about 8 hours.

Ordinarily, hydrolysis of the reaction mixture to effect release of the secondary alcohol and to "kill" remaining alkylaluminum compounds is effected by combining water with the reaction system. It is also within the scope of the invention to employ materials containing water, such as weak bases and weak acids and also other compounds which are capable of effecting the hydrolysis reactions, including aliphatic alcohols such as ethanol, propanol, etc. In general, the only limitation on the hydrolyzing agent is that it be substantially inert to the desired reaction products.

The following examples of reactions between various trialkylaluminum compounds and some typical acyl halides will serve to illustrate the manner in which the process of the present invention is carried out.

*Example 1*

A solution of 78 ml. of trioctylaluminum in 100 ml. of benzene was added slowly to a solution of 35.5 ml. of acetyl chloride in 150 ml. of benzene. The benzene served as an inert solvent carrier for the two reactants. Addition was made at approximately 23° C. As the reaction proceeded, the temperature of the reaction mixture was maintained at 40° C. by cooling. After standing for one hour, the mixture was poured over 500 grams of crushed ice to hydrolyze the trioctylaluminum (and the di- and monoalkylaluminum chloride produced in the reaction) and thus stop the reaction. The organic layer of the mixture was then separated, dried and distilled. A fraction of boiling range 166–168° C. at 195 mm. Hg was obtained. Analysis indicated that this fraction was 57 percent 2-decanone and 43 percent 2-decanol. This represented an over-all reaction yield of about 12 percent 2-decanone and 10 percent of the 2-decanol.

*Example 2*

A 100 ml. flask was charged with a solution of 1.42 ml. of acetyl chloride (0.02 mole or 0.02 equivalents) in an inert atmosphere. To this was incrementally added over a period of fifteen minutes a 50 percent solution of 0.02 equivalents of triethylaluminum in octane. The octane was selected for subsequent usage as an internal standard for the vapor phase chromatographic analysis of the products of the reaction. The addition was made at 0° C. The reaction mixture was allowed to stand for one hour, during which time the temperature of the mixture was maintained at approximately 23° C. Four ml. of water was then added to the mixture to stop the reaction by hydrolysis of the alkylaluminum compounds. The aqueous layer was saturated with sodium chloride and the organic layer separated. Analysis by vapor phase chromatography indicated a 42 percent yield of 2-butanone and a 3 percent yield of 2-butanol.

*Example 3*

The reaction of Example 2 was repeated with the addition of the triethylaluminum again being carried out at 0° C. The temperature of the reaction mixture was then held at 25° C. for a standing period of two and one-half hours. Following hydrolysis by the addition of 4 ml. of water, the reaction products were analyzed by vapor phase chromatography. A yield of 38 percent 2-butanone and 5 percent 2-butanol was obtained, indicating that, when the reaction mixture was allowed to stand for an additional hour and one-half before halting the reaction, approximately 2 percent of the ketone product was reduced to the corresponding secondary alcohol. Another 2 percent of the ketone was removed from the reaction products by reaction with the triethylaluminum and monomethylaluminum dichloride and, perhaps to some extent, by condensation of pairs of molecules of the ketone to form complex compounds.

*Example 4*

The reaction of Example 2 was repeated with the addition of the triethylaluminum being carried out at 25° C. instead of at 0° C. as in Examples 2 and 3. The temperature of the reaction mixture was then maintained at 25° C. for a standing period of one hour and twelve minutes. The reaction was then halted by the addition of 4 ml. of water. Analysis of the reaction products showed that a yield of 33 percent 2-butanone and 6 percent 2-butanol was obtained. A comparison of the results obtained in Examples 2, 3 and 4 indicates that higher yields of the ketone are obtained when the addition of the trialkylaluminum to the acyl halide is carried out at lower temperatures. It also appears that reduction of the ketone to the secondary alcohol is favored by the higher addition temperature employed in Example 4.

Example 5

The reaction of Example 2 was repeated using toluene as the inert solvent for the acetyl chloride instead of benzene. The triethylaluminum solution was added to acetyl chloride solution at a temperature of 0° C. The reaction mixture was then permitted to stand for one-half hour at a temperature of 25° C. After this time, the temperature of the reaction mixture was allowed to rise to 40° C. and maintained at this temperature for an additional one-half hour. The alkylaluminum compounds in the reaction mixture were then hydrolyzed by the addition of water to interrupt the reaction. Analysis of the reaction products by vapor phase chromatography showed a yield of 26 percent of the 2-butanone and 10 percent of the 2-butanol. These results confirm the indication of Example 3 that subjection of the reaction mixture to higher temperatures during the standing time appears to favor the production of the alcohol. It also appears, however, that the loss of the ketone due to reaction with the alkylaluminum compounds and/or co-condensation proceeds at a higher rate when the reaction mixture temperature is allowed to reach and remain at a higher value during the standing period.

Example 6

The reaction of Example 2 was repeated using a mixture of toluene and diethyl ether as the inert solvent for the acetyl chloride instead of benzene. The triethylaluminum was added to the acetyl chloride at a temperature of 0° C. The reaction mixture was then maintained at a temperature of 40° C. for eight hours. Four ml. of water was then added to the mixture to interrupt the reaction. Analysis of the products indicated a yield of 6 percent 2-butanone and 13 percent 2-butanol. Thus, as shown by comparing the results obtained in Examples 5 and 6, allowing the reaction to continue for an extended period of time appears to favor the undesirable reaction of the ketone with the triethylaluminum and mono-ethylaluminum dihalide at the expense of the final yield of the uncombined ketone. It is to be noted, however, that a small additional amount of the secondary alcohol can be obtained by allowing the reaction to proceed for a longer period of time.

Example 7

A 100 ml. flask was charged with 15 ml. of benzene and 0.02 equivalents of benzoyl chloride in an inert atmosphere. 0.50 ml. of dodecane was added to serve as an internal standard in the vapor phase chromatographic analysis of the reaction products. 0.02 equivalent of triethylaluminum was then slowly added to the flask while maintaining the temperature of the ingredients of the flask at between 20° C. and 23° C. Samples of the reaction mixture were then taken from the flask at time intervals ranging up to twenty hours following addition of the triethylaluminum and the reaction in the samples halted by the addition of water. Over the period of taking the samples from the flask, the temperature of the reaction mixture in the flask was held at 24° C. for the first hour, allowed to rise to 40° C. between the first and second hours, and then maintained at 40° C. for the duration of the twenty-hour period. Results of the analysis of each of the samples following hydrolysis were tabulated as follows:

| Time (Hours) | Temperature of Reaction Mixture (° C.) | Percent AlEt₃ Reacted | Percent Yield Propiophenone |
|---|---|---|---|
| 0 | 23 | 40 | 11 |
| 1 | 24 | 40 | 12 |
| 2 | 40 | 54 | 16 |
| 3 | 40 | 62 | 15 |
| 7 | 40 | 70 | 17 |
| 20 | 40 | 94 | 14 |

These results indicate that the maximum yield of the ketone is achieved in from two to seven hours; and that, commencing at some time between the seventh and twentieth hour of the reaction, the propiophenone, partially by reduction to the alcohol but largely by reaction with the ethylaluminum compounds, is lost slightly faster than it is produced, thereby reducing the total ketone yield.

Example 8

A 100 ml. flask was charged with 15 ml. of benzene, 0.50 ml. of dodecane, and 0.02 mole (0.02 equivalent) of benzoyl chloride in an inert atmosphere. To this was added at 10° C. over a period of about one hour, 0.02 mole (0.06 equivalent) of triethylaluminum. A sample was then immediately taken from the flask, hydroylzed to stop the reaction, and analyzed. Three other samples were taken after several spaced time intervals and treated similarly. The results of these analyses were tabulated as follows:

| Time | Temperature, ° C. | Percent Yield of Propiophenone |
|---|---|---|
| 0 | 10 | 44 |
| 15 minutes | 25 | 40 |
| 2 hours | 25 | 36 |
| 20 hours | 25 | 29 |

The high yields of Example 8, where the equivalents ratio of the trialkylaluminum to the acyl halide was 3 to 1, indicate that substantially improved yields result if a substantial excess of trialkylaluminum is employed in carrying out the reactions.

From the foregoing description, it will be apparent that the present invention provides a process for economically preparing ketones and secondary alcohols by the reaction of trialkylaluminum with acyl halides. The significance of certain process conditions has been indicated. It is apparent, of course, that those skilled in the art, by practicing the principles of the present invention, my successfully prepare substantial yields of various ketones and secondary alcohols other than those specifically mentioned in the above-cited examples. Insofar as such preparations are prompted by, and carried out in accordance with, the material disclosed in this specification and embraced in the following claims, such preparations are deemed to be practices prescribed by such Letters Patent as shall issue upon this application.

I claim:
1. A process for preparing ketones which comprises reacting a trialkylaluminum at a temperature of about 0° C.–40° C., with an acyl halide in an inert atmosphere, said acyl halide being of the formula:

wherein R′ is selected from the group consisting of alkyl, cycloalkyl, aryl, aralkyl, and alkaryl radicals, and X is selected from the group consisting of chloride, bromide and iodide; and then hydrolyzing the reaction mixture prior to completion of the reaction between said trialkylaluminum and said acyl halide.

2. The process of claim 1 in which the reaction is conducted by incrementally adding the trialkylaluminum to the acyl halide.

3. The process claimed in claim 2 wherein said acyl halide is acetyl chloride and said trialkylaluminum is trioctylaluminum.

4. The process claimed in claim 2 wherein said acyl halide is acetyl chloride and said trialkylaluminum is triethylaluminum.

5. The process claimed in claim 2 wherein said acyl halide is benzoyl chloride and said trialkylaluminum is triethylaluminum.

6. The process of claim 2 in which the trialkylaluminum is employed in an amount equal to 3 equivalents per equivalent of the acyl halide.

7. A process for preparing ketones and secondary alcohols which comprises incrementally adding a trialkylaluminum to an acyl halide in an inert atmosphere at a temperature of about 0° C–25° C., said acyl halide being of the formula:

wherein R′ is selected from the group consisting of alkyl, cycloalkyl, aryl, aralkyl, and alkaryl radicals, and X is selected from the group consisting of chloride, bromide and iodine; allowing the reaction to proceed at a temperature of from about 0° C.–40° C. for between about 0.01 and about 20 hours; and then, prior to completion of the reaction between said trialkylaluminum and said acyl halide, adding water to the reaction mixture to release the secondary alcohol and hydrolyze the trialkylaluminum to prevent further reaction.

8. The process claimed in claim 7 wherein said acyl halide is acetyl chloride and said trialkylaluminum is trioctylaluminum.

9. The process claimed in claim 7 wherein said acyl halide is acetyl chloride and said trialkylaluminum is triethylaluminum.

10. The process of claim 7 in which the acyl halide is acetyl chloride and the trialkylaluminum is triethylaluminum, and in which the time during which the reaction is allowed to proceed following addition of the triethylaluminum to the acetyl chloride is between about 1 and about 2½ hours.

References Cited in the file of this patent

Adkins et al.: J. Am. Chem. Soc., volume 73, pages 2854–6 (1951).

Guademar: Comp. Rend., volume 239, pages 1303–5 (1954).

UNITED STATES PATENT OFFICE
CERTIFICATE OF CORRECTION

Patent No. 3,154,585            October 27, 1964

Pat W. K. Flanagan

It is hereby certified that error appears in the above numbered patent requiring correction and that the said Letters Patent should read as corrected below.

Column 2, line 43, for "(b)" read -- (d) --; column 6, line 41, for "my" read -- may --.

Signed and sealed this 20th day of April 1965.

(SEAL)
Attest:

ERNEST W. SWIDER            EDWARD J. BRENNER
Attesting Officer            Commissioner of Patents